(12) United States Patent
Miller et al.

(10) Patent No.: US 7,385,501 B2
(45) Date of Patent: *Jun. 10, 2008

(54) SYSTEM FOR DYNAMICALLY PUSHING INFORMATION TO A USER UTILIZING GLOBAL POSITIONING SYSTEM

(75) Inventors: John M. Miller, 626 E. Kilbourn Ave. #2206, Milwaukee, WI (US) 53202; Himanshu S. Amin, 37474 Mera Ct., Solon, OH (US) 44139

(73) Assignees: Himanshu S. Amin, Milwaukee, WI (US); John M. Miller, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/195,947

(22) Filed: Aug. 3, 2005

(65) Prior Publication Data

US 2005/0264417 A1 Dec. 1, 2005

Related U.S. Application Data

(63) Continuation of application No. 10/824,962, filed on Apr. 15, 2004, which is a continuation of application No. 09/523,022, filed on Mar. 10, 2000, now Pat. No. 6,741,188, which is a continuation-in-part of application No. 09/426,065, filed on Oct. 22, 1999, now Pat. No. 6,353,398.

(51) Int. Cl.
- *G08B 1/08* (2006.01)
- *G06F 7/00* (2006.01)
- *G01C 21/00* (2006.01)
- *G08G 1/123* (2006.01)

(52) U.S. Cl. ............... 340/539.13; 340/995.1; 340/995.24; 701/200; 707/10; 707/104.1

(58) Field of Classification Search ........ 340/988–996, 340/539.13; 701/200–302; 707/10–104.1
See application file for complete search history.

(56) References Cited

U.S. PATENT DOCUMENTS

| | | |
|---|---|---|
| 5,293,163 A | 3/1994 | Kakihara et al. |
| 5,579,535 A | 11/1996 | Orlen et al. |
| 5,648,768 A | 7/1997 | Bouve |
| 5,682,525 A | 10/1997 | Bouve et al. |
| 5,796,634 A | 8/1998 | Craport et al. |
| 5,938,721 A | 8/1999 | Dussell et al. |
| 5,946,687 A | 8/1999 | Gehani et al. |

(Continued)

FOREIGN PATENT DOCUMENTS

EP 0785535 7/1997

OTHER PUBLICATIONS

U.S. Appl. No. 11/195,923, filed Oct. 1999, Miller et al.*

(Continued)

*Primary Examiner*—Benjamin C Lee
(74) *Attorney, Agent, or Firm*—Himanshu S. Amin; John M. Miller; Amin, Turocy & Calvin, LLP

(57) ABSTRACT

A computer implemented method is provided for directing region-specific information. The method receives information relating to location of users, and provides location-specific information to the users.

20 Claims, 11 Drawing Sheets

U.S. PATENT DOCUMENTS

| | | | |
|---|---|---|---|
| 5,961,569 A | 10/1999 | Craport et al. | |
| 5,961,572 A | 10/1999 | Craport et al. | |
| 5,964,821 A | 10/1999 | Brunts et al. | |
| 5,978,747 A | 11/1999 | Craport et al. | |
| 5,987,454 A | 11/1999 | Hobbs | |
| 6,013,007 A * | 1/2000 | Root et al. | 482/8 |
| 6,014,090 A * | 1/2000 | Rosen et al. | 340/905 |
| 6,023,223 A | 2/2000 | Baxter, Jr. | |
| 6,047,327 A | 4/2000 | Tso et al. | |
| 6,081,780 A | 6/2000 | Lumelsky | |
| 6,088,651 A * | 7/2000 | Nageswaran | 701/208 |
| 6,107,961 A * | 8/2000 | Takagi | 342/357.13 |
| 6,122,520 A * | 9/2000 | Want et al. | 455/456.2 |
| 6,144,318 A | 11/2000 | Hayashi et al. | |
| 6,148,261 A | 11/2000 | Obradovich et al. | |
| 6,151,624 A | 11/2000 | Teare et al. | |
| 6,154,172 A | 11/2000 | Piccionelli et al. | |
| 6,154,745 A | 11/2000 | Kari et al. | |
| 6,192,314 B1 | 2/2001 | Khavakh et al. | |
| 6,199,099 B1 | 3/2001 | Gershman et al. | |
| 6,202,023 B1 | 3/2001 | Hancock et al. | |
| 6,252,544 B1 * | 6/2001 | Hoffberg | 342/357.1 |
| 6,353,398 B1 * | 3/2002 | Amin et al. | 340/995.12 |
| 6,381,603 B1 | 4/2002 | Chan et al. | |
| 6,741,188 B1 * | 5/2004 | Miller et al. | 340/995.1 |
| 6,912,398 B1 | 6/2005 | Domnitz | |
| 6,993,429 B2 * | 1/2006 | Obradovich et al. | 701/200 |
| 2005/0264417 A1 | 12/2005 | Miller at al. | |
| 2005/0266858 A1 | 12/2005 | Miller et al. | |
| 2005/0272442 A1 | 12/2005 | Miller et al. | |
| 2006/0019676 A1 | 1/2006 | Miller at al. | |

OTHER PUBLICATIONS

U.S. Appl. No. 10/824,962, filed Apr. 2004, Miller et al.*

Bradley J. Rhodes, The wearable remembrance agent: a system for augmented memory, Personal Technologies Journal Special Issue on Wearable Computing, 1997, 218-224, vol. 1.

Andrew E. Fano, Shopper's Eye: Using Location-based Filtering for a Shopping Agent in the Physical World, Proceedings of the Second International Conference on Autonomous Agents, 1998, 6 Pages.

MIT-Toshiba Research Collaboration and Public Demonstration, "http://ascii24.com/news/i/topi/article/1998/11/25/614216-000.html?geta" 1998.

* cited by examiner

SYSTEM FOR DYNAMICALLY PUSHING INFORMATION TO A USER UTILIZING GLOBAL POSITIONING SYSTEM

CROSS REFERENCE TO RELATED APPLICATIONS

This application is a continuation of U.S. patent application Ser. No. 10/824,962 entitled "SYSTEM FOR DYNAMICALLY PUSHING INFORMATION TO A USER UTILIZING GLOBAL POSITIONING SYSTEM" and filed on Apr. 15, 2004, which is a continuation of U.S. patent application Ser. No. 09/523,022 entitled "SYSTEM FOR DYNAMICALLY PUSHING INFORMATION TO A USER UTILIZING GLOBAL POSITIONING SYSTEM" and filed on Mar. 10, 2000, (now issued as U.S. Pat. No. 6,741,188), which is a continuation-in-part of U.S. patent application Ser. No. 09/426,065 filed Oct. 22, 1999 (now issued as U.S. Pat. No. 6,353,398).

FIELD OF THE INVENTION

The present invention described below generally relates to a system for directing information to specific geographic locations at related points in time, and more particularly to dynamically communicating linked information to mobile users at specific geographic locations via a global satellite positioning system.

BACKGROUND OF THE INVENTION

Global positioning systems provide many conveniences for modern living. People may find themselves in completely unknown areas, and yet, they may have the comfort of knowing a system has their location pinpointed and directed on a computer screen. Still better yet, global positioning systems may provide directions for going from the unknown location to a known location. While many users of conventional global positioning systems value received location and directional information, more specific and detailed information related to the location is often needed. It is common experience to arrive at a particular destination (e.g., business or restaurant) after closing. Though a positioning system may have provided the directions to the location, it would be useful to know what the normal business hours were for example when arriving at the location. Likewise, it would be useful for a system to present all known entity types in a certain region. If a person was in an unfamiliar city for example, and needed medical care, simply knowing the present location would not direct the person to the nearest hospital. A more powerful system is therefore necessary to provide mobile users with specific information relating to the point in time the user is at a specific location. This type of system is currently not provided for with conventional systems.

In view of the above issues, it would be desirable for a system which can provide relevant information to location-specific users at relevant points in time.

SUMMARY OF THE INVENTION

The present invention provides a system for directing and receiving information to and from geographically relevant locations. The system links information from the internet or other relevant databases that is related to region-specific areas and directs the information to users situated near the region-specific areas. The possibilities for the type of information that may be linked to a geographic location is virtually limitless. In one particular instance, a store may announce a bargain sale at the same point in time that a customer is in close proximity. In another instance, a mobile user could stop at a home and receive information from a homeowner who happens to be away or leave a message for the homeowner with the message easily retrieved from a web page or e-mail system. In still yet another instance, a menu may be observed for a restaurant simply by approaching the restaurant. The type of information received from substantially any location resides in data bases, such as the Internet, linked to the location by the present invention.

The present invention also provides for bidirectional operations. For instance, a query can be made inquiring of all the hospitals located within a square mile of the present location. The query in fact may be substantially as broad or narrow as the user desires. The same hospital locations may be queried for a given city or state, for example. As can be appreciated, this type of information may be crucial to receiving emergency health care when one is in a time critical situation and in unfamiliar surroundings.

The present invention also provides for directing information to users who meet certain criteria. Citing the example above, the store advertisement may be directed to only those drivers who are above or below a certain income level, for example. This type of demographic information may be obtained, for example, from the vehicle type (e.g., expensive sports car), from past purchasing practices, or from surveys and studies. The present invention also provides a hand-held system which allows users to receive region-specific information directed to the user's particular location. For example, a user may be situated in a new location, and the user may then request and receive information about restaurants within a defined area defined by the user. For example, the user may query for restaurants within three blocks or within the entire city and receive specific audio and/or display information related to the query.

According to another aspect of the present invention, information searches and queries may be defined and/or limited by the geographical position of a mobile user. This enables the user to select/query a desired topic while the system locates and directs information related to the user's location. This may be accomplished, for example, by associating a region identifier to individual web sites. A mobile communications system gathers position information from a GPS system and directs information related to the users physical location based upon the region identifier associated with the individual website. Information searches are then refined to those regionally identified positions of the user and related to a particular topic of interest. For example, an internet query of restaurants would normally retrieve thousands of hits on a conventional search engine. By relating the search to the user's physical location, only those restaurants associated with the user's identified region, are provided. Thus, valuable time is saved and considerable convenience is provided by retrieving information related to a particular location.

To the accomplishment of the foregoing and related ends, the invention, then, comprises the features hereinafter fully described. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
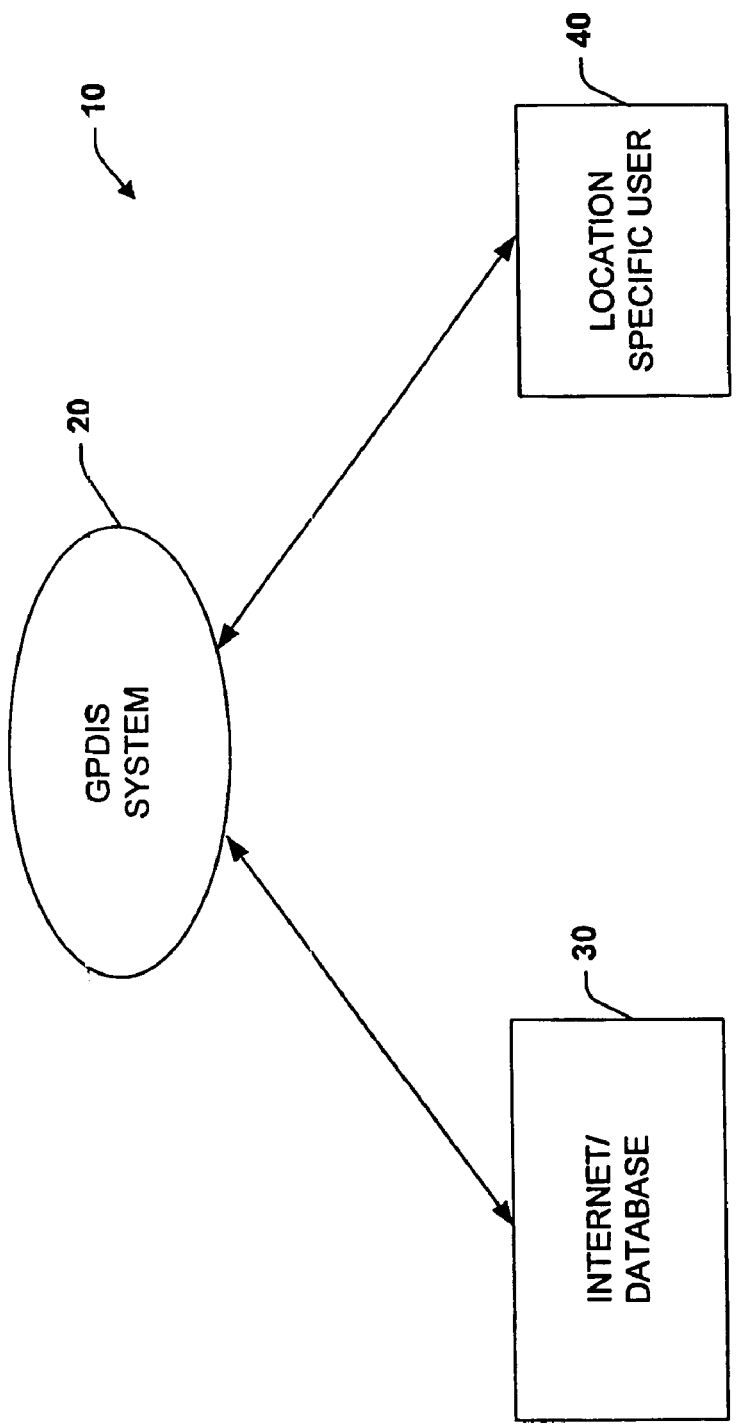
FIG. 1 is a block diagram of a global positioning directed information system in accordance with the present invention.

The present invention will now be described with reference to the drawings, wherein like reference numerals are used to refer to like elements throughout.

Referring initially to FIG. 1, a global positioning directed information system (GPDIS) 20 having whereabout information from a location-specific user system 40 is shown. The GPDIS 20 has access to an information system such as the Internet 30 for providing region-directed information to a location-specific user system 40 at any suitable point in time. It is to be appreciated that the information system may include other data bases than the Internet 30. The GPDIS 20 includes a satellite tracking system (not shown) such as a global positioning system (GPS) for locating users and transmitting information to and from the user. A directed information system (not shown) is combined with the GPS by the present invention to link the Internet system information with location-specific users. The directed information system is a bidirectional system that allows specific information to be linked and transmitted to specific geographic locations at specific points in time. Users may have information directed to them as they come within a predetermined proximity to certain locations or conversely, users may acquire relevant information that is related to a particular area the user may happen to be in.

The directed information system includes an object oriented computing and software system for linking relevant regional information sources to users associated with the particular region. For example, the directed information system may define sectional regions in a city and associate particular information with those regions. Whenever a location-specific user is located within a particular region, the directed information system may automatically transmit the region-specific information to the location directed by the user. The location-specific user system 40 is preferably a mobile system and includes a display and audio information system for communicating information to the user. Also, a sending/receiving system is included for communicating with the GPS system. The display system communicates a plurality of relevant visual information related to a particular region at a particular point in time. The audio system provides audio related information to the mobile system. For example, as the user approaches a predetermined distance to a gas station, an audio message may alert the driver to a sale for motor oil. The audio and visual information may be changed as often as desired by any particular location by simply changing the contents of the Internet data base. The mobile location-specific user system 40 may be implemented in a plurality of systems. For example, automobile systems, cellular telephone systems, and hand-held mobile systems known as "palm pilots" may be employed to push information to users.

Figure 2:
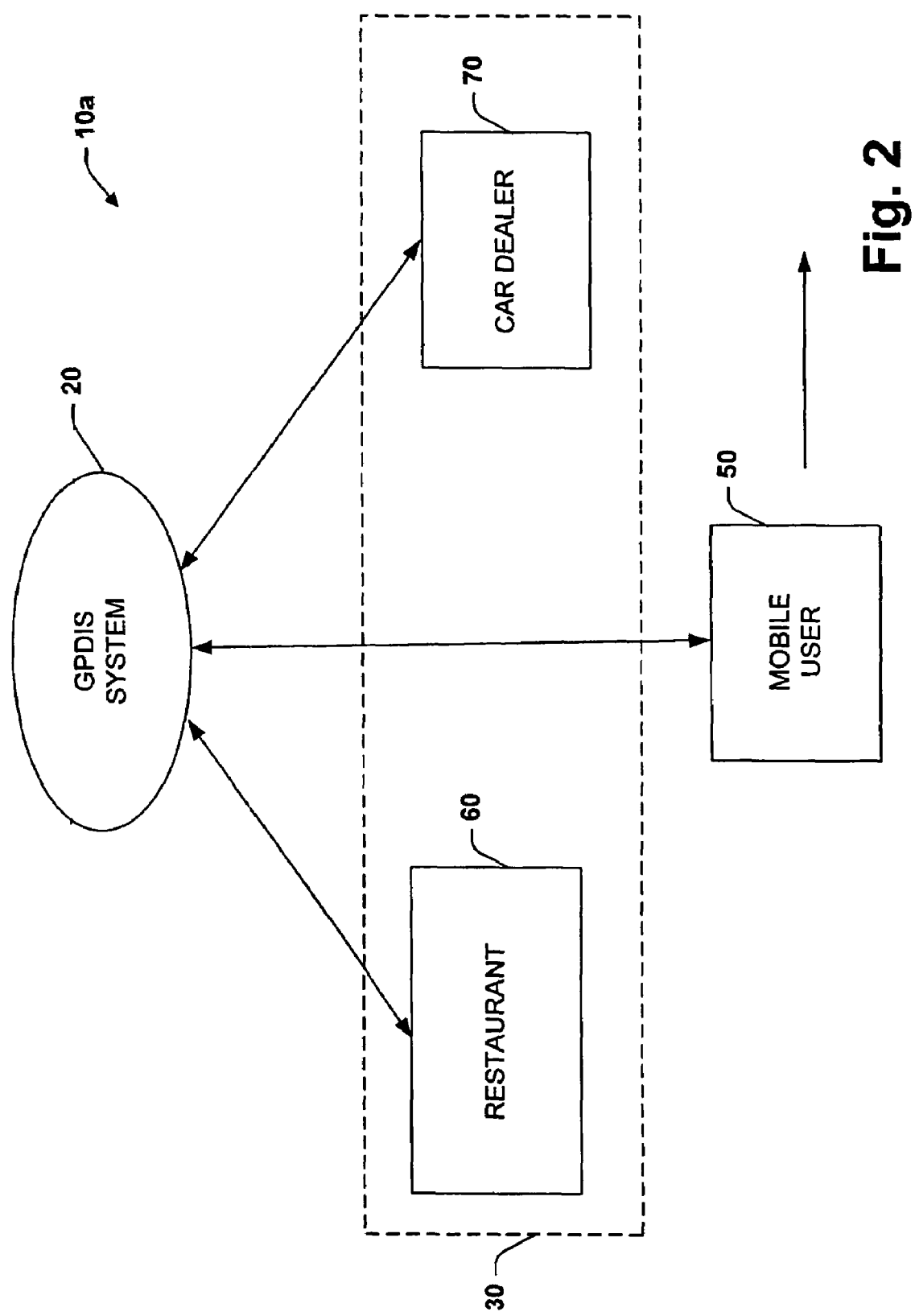
FIG. 2 is a block diagram depicting a region directed information system in accordance with the present invention.

Now referring to FIG. 2, a particular embodiment of the present invention is shown employing push technology. A mobile user 50 is shown passing by a restaurant 60 and a car dealership 70. The GPDIS 20 detects that the mobile user 50 is within a predetermined region that the restaurant and dealership are part of. The directed information system of the GPDIS 20 links a web page or data source residing on the Internet 30 related to the restaurant 60 and pushes the information via the GPS to the mobile user 50 as the user drives by the restaurant. Likewise, the directed information system pushes car dealership information to the user as the user passes or is near the predetermined vicinity of the car dealership by linking internet information related to the car dealership.

Push technology is implemented as part of the directed information system of the GPDIS 20, however, since object oriented programming is employed, the push technology may be implemented across several systems. The technology is based in part on movement detection provided by a global positioning system. As a user moves within a predetermined distance of any particular region, the directed information system pushes information to the user in connection to the movement. Upon notification of the users whereabouts by the GPS, the directed information system links relevant information that is associated with the particular geographical location and subsequently provides the information to the GPS for transmittal to the user as the user is within the predetermined area for reception of the relevant information. As the user is moving, different audio and visual information is pushed in connection with the movement. For example, as a user is within a first geographical region, Internet data associated with a first storage data section is pushed to the user. As the user moves to a second geographical location, data associated with a second storage data section is pushed to a user. Clearly, this sequence may be continued substantially.

Figure 3:
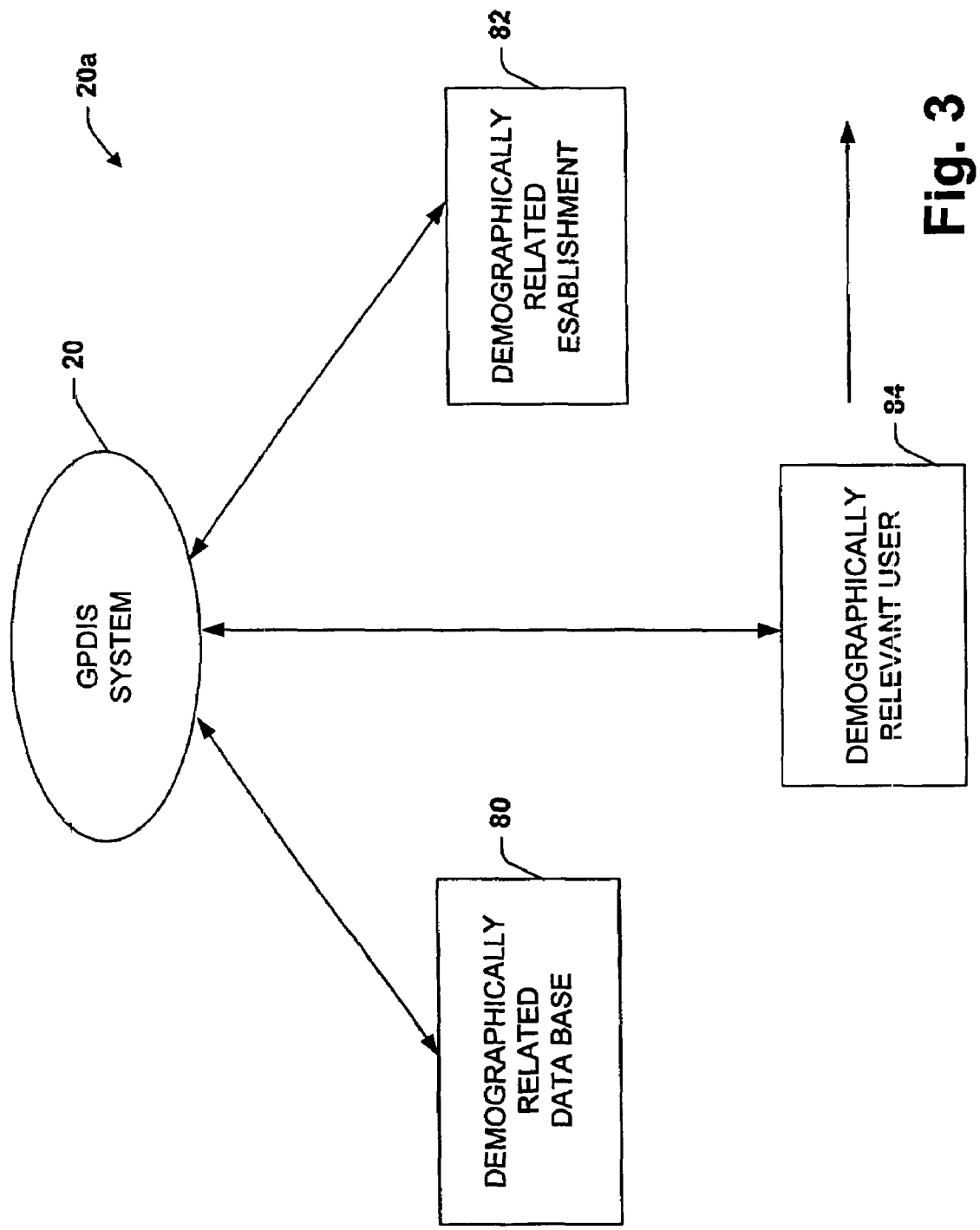
FIG. 3 is a block diagram of a focus directed information system in accordance with the present invention.

Now referring to FIG. 3 another embodiment of the present invention is shown. A focus directed information system 20a is shown. The focus directed system 20a combines the directed information system mentioned above with a selectively defined criteria parameter. The selectively defined criteria may include demographic and other related criteria for linking specific information to a regionally located user. For example, as shown in FIG. 3, a demographically relevant user 84 may be riding in an expensive sports car. A demographically related data base 80 is the linked to by the GPDIS 20 that contains relevant businesses that may cater exclusively to persons above a certain income level. As the car is driven within a predetermined distance of a demographically related establishment 82, the GPDIS provides demographically related information 80 to the demographically relevant user 84. It is to be appreciated that demographic information may be obtained for users in a variety of ways. For example, users may provide survey information which is stored as part of the demographic data base. It is further to be appreciated that other information may trigger the directed information system to transmit relevant information to a user. For example, purchasers of electronic items may be sent notices as they pass within predetermined distances of the electronics store. The electronics store data base is established from past purchases of electronics.

Figure 4:
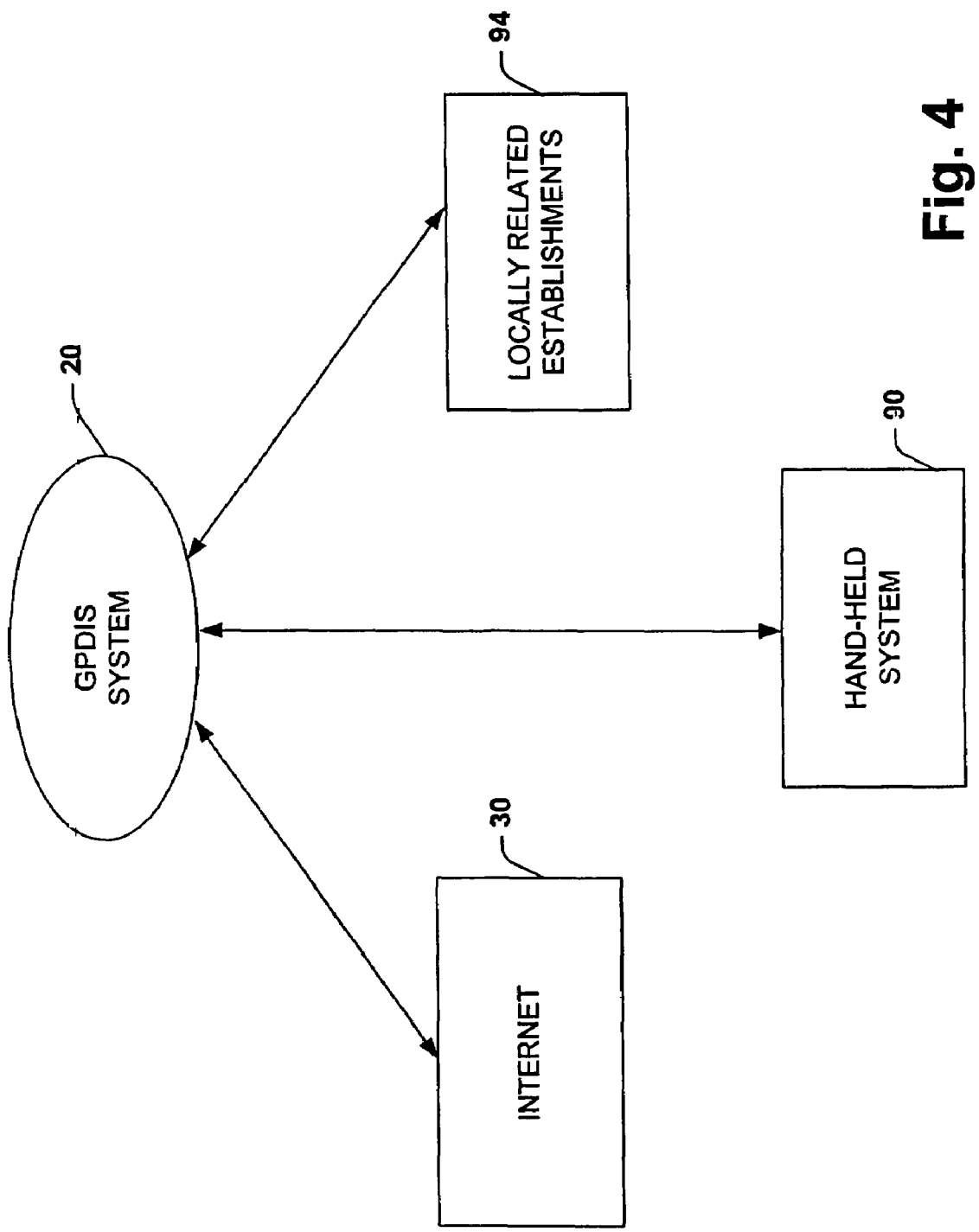
FIG. 4 is a block diagram of a hand-held directed information system in accordance with the present invention.

Turning now to FIG. 4, another embodiment of the present invention is shown.

A hand-held system 90 is shown which may wirelessly communicate with the directed information system of the GPDIS 20. The hand-held system (e.g., palm pilot) contains a computing and data input/output system (e.g., keypad, microphone, speaker) for directing queries to and receiving information from the directed information system. For example, a user may have the hand-held system 90 in a city the user is new to. The user may direct a query to the GPDIS 20 inquiring which locally related establishments 94 (e.g., restaurants, hospitals, businesses) are located within a square block of the user's present location. Upon receiving the request, the directed information system finds the related establishments within the square block, locates related Internet 30 data base information and transmits the information to the hand-held system 90 for audio or visual display. It is to be appreciated that the user may have any suitable information delivered for which the directed information system has links for the specified region. As described above, push technology may also be employed to provide information to the hand-held system.

Figure 4A:
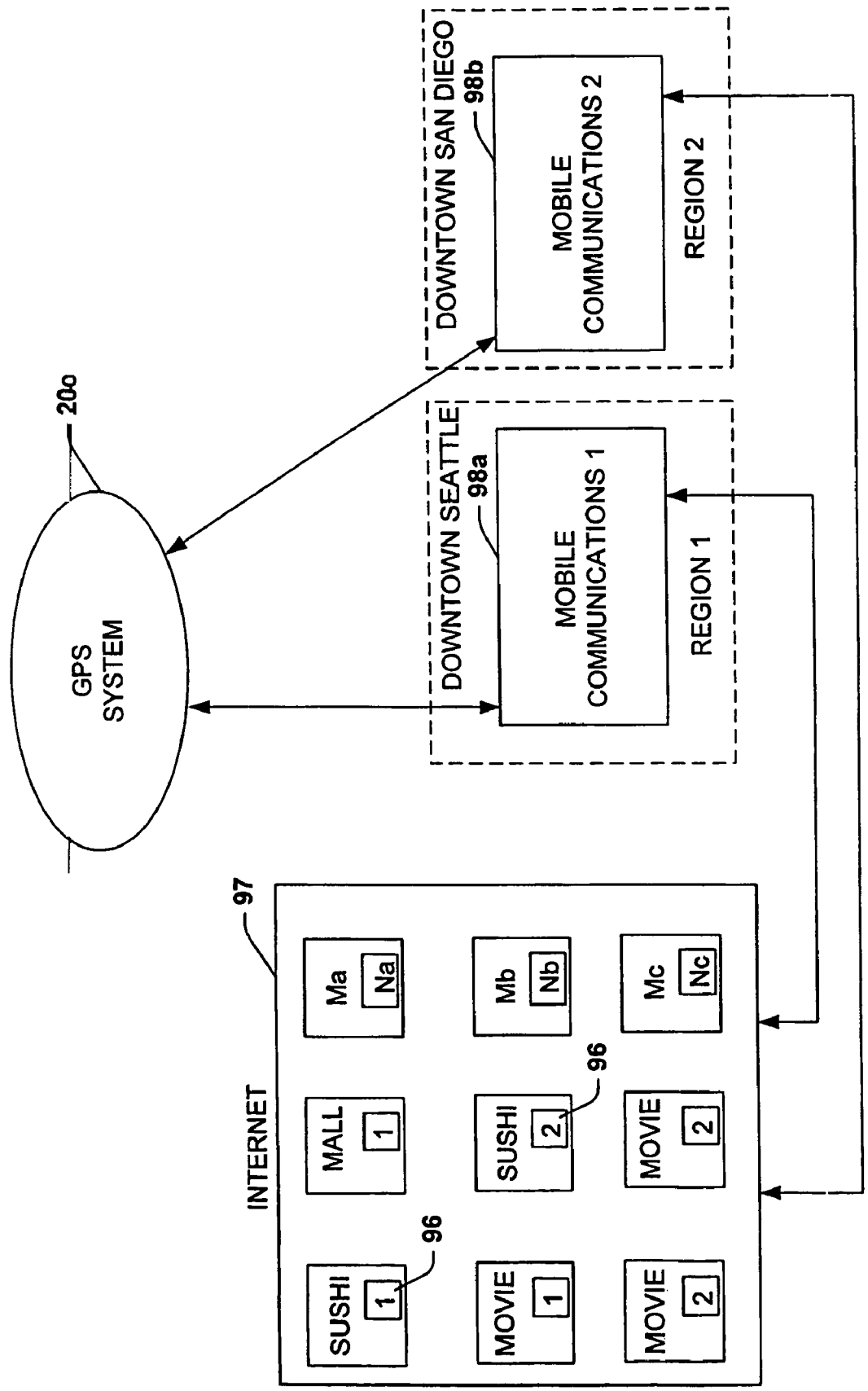
FIG. 4a is a block diagram of a regionally-identified information system in accordance with the present invention.

Referring now to FIG. 4*a*, another aspect of the present invention relates to embedding in a web site a field, code or other suitable identifier of a geographic region corresponding to the web site. For example, the United States may be divided into N number of regions (N being an integer). There may be M number of websites (M being an integer), wherein each website is associated with at least one of the N number of regions—each of the N regions having a unique identifier. For illustrative purposes, N=2 and M=9 as shown in FIG. 4*a*. It is to be appreciated that M and N may be substantially any number. When a search is performed on the Internet 97 or other similar type of communication medium, a region identifier 96 is employed as part of the search to narrow the search results to websites associated with a particular geographic region of interest. The embedding of the region identifier 96 into the website (or associating the region identifier with the website) may be accomplished via XML language for example or any other suitable means.

One system in accordance with the present invention integrates a portable mobile communications unit, 98*a* and 98*b* for example, with a GPS system 20*e* and a region identifier of the present invention. More particularly, the mobile communications units 98*a* and 98*b* are operatively coupled to a GPS system 20*e* which affords for dynamically identifying a physical location of the mobile communications unit as well as tracking the movement of the unit. The units are also operatively coupled to the Internet 97 and includes a system (e.g., web browser) for performing searches on the Internet. A user of the mobile communication unit can conduct an Internet search via the unit and limit the search by employing the GPS system associated therewith as well as the region identifier. For example, if a user is in downtown Seattle, Wash. and desires to search the Internet for a sushi restaurant. The user can initiate a web search from the unit. The GPS system associated with the unit will identify that the user is located in downtown Seattle. The user will input a search term such as "sushi restaurant". The system of the present invention will automatically insert a unique region identifier (e.g., N=0001100100011110) associated with a one square mile region wherein the mobile communication unit is located at the center of the one square mile region. The search results will then be limited to websites relating to sushi restaurants originating and/or associated with that particular one square mile region. Thus, the user is able to quickly locate a sushi restaurant within one square mile of his/her present location.

A similar type of search using conventional systems employing search terms such as "sushi", "Seattle" and "restaurant" would likely have resulted in thousands of hits—most of which are not of interest to the user.

It is to be appreciated that the size of the unique region identifier may be suitably tailored to meet a user's particular search needs. Furthermore, it is to be appreciated that the user may also tailor the shape and direction of the unique region identifier. For example, the user may wish for the search to be conducted in a circular region, parabolic region, triangular region, etc., or the user may wish that the unique region identifier be of a particular shape and/or direction (e.g., N., S., E. or W.).

Furthermore, if the user is on the move, the system may dynamically update the search results to correspond to the changing location of the mobile communication unit.

Figure 5:
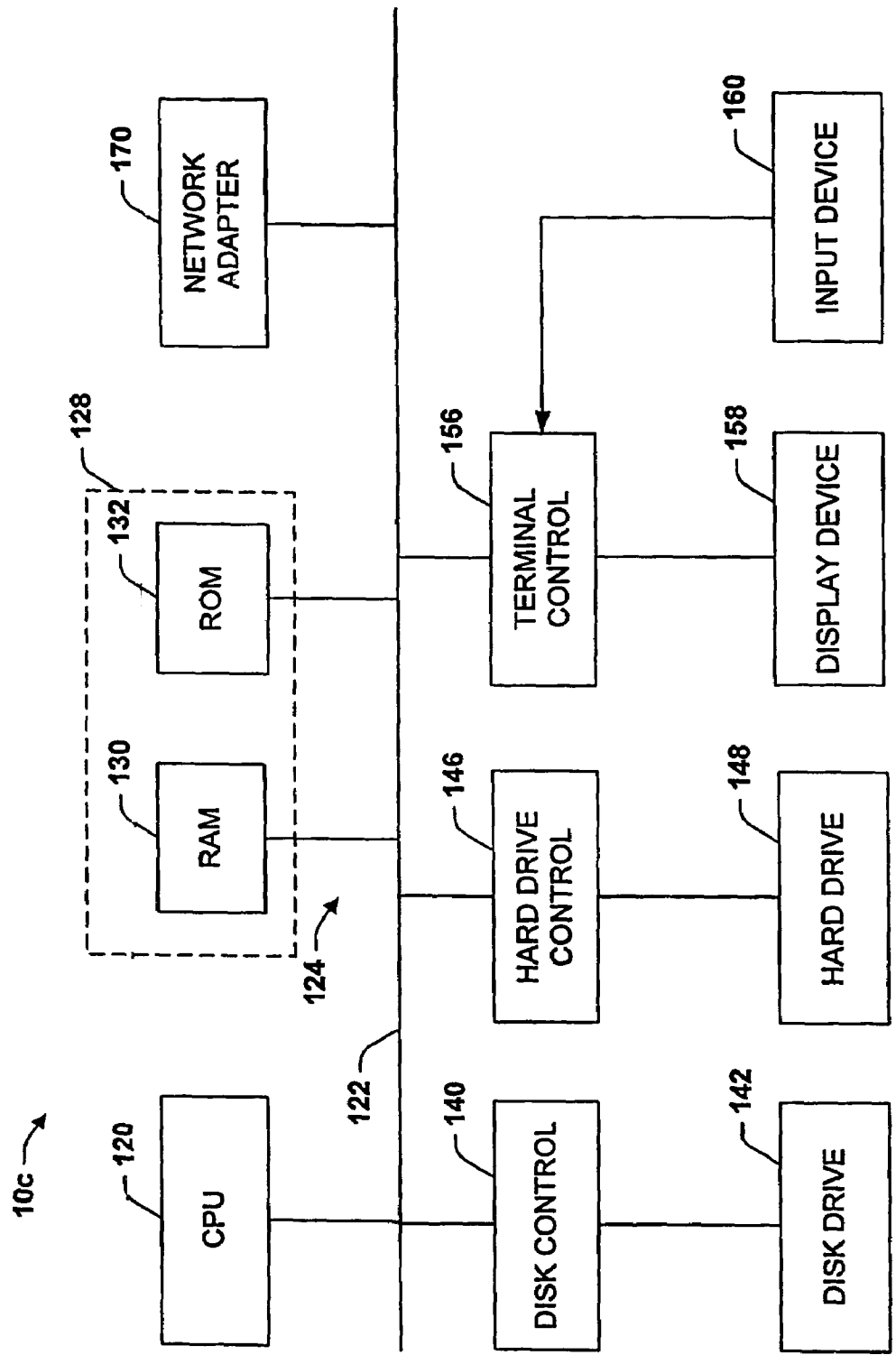
FIG. 5 is a schematic block diagram of a system in accordance with the present invention.

Referring now to FIG. 5, a detailed block diagram of a computer system 10*c* is shown in accordance with the present invention. This system may be employed as either a client and/or a server in accordance with the present invention and may be implemented by any of the systems including the directed information system or the hand-held system described above. The computer system 10*c* includes a central processing unit (CPU) 120 which is coupled to a bus 122. The CPU or processor 120 can be any of a plurality of processors, such as the Pentium, Pentium II, Pentium MMX, Pentium Merced, Power PC, SPARC, SGI_MIPS and other similar and compatible processors. It will be appreciated that since the present invention provides for a multi-platform environment as described in greater detail below, most major processors and/or computers may be employed to carry out the present invention. The processor 120 functions to perform various operations described herein as well as for carrying out other operations related to the system 10*c*. The manner in which the processor 120 can be programmed to carry out the functions relating to the present invention will be readily apparent to those having ordinary skill in the art based on the description provided herein.

The bus 122 includes a plurality of signal lines 124 for conveying addresses, data and controls between the CPU 120 and a number of other system bus components. The other system bus components include a memory 128 (including a Random Access Memory (RAM) 130 and a Read Only Memory (ROM) 132) and a plurality of input/output (I/O) devices. The memory 128 serves as data storage and may store appropriate operating code to be executed by the processor 120 for carrying out the functions described herein.

The RAM 130 provides program instruction storage and working memory for the CPU 120. The ROM 132 contains software instructions known as the Basic Input/Output System (BIOS) for performing interface operations with the I/O devices. Also stored in the ROM 132 is a software routine which operates to load a boot program from the booting device. The boot program will typically be executed when the computer system 10c is powered on or when initialization of the system 10c is needed.

The I/O devices (optionally included in the mobile systems) include basic devices such as data storage devices (e.g., floppy disks, tape drives, CD ROMs, hard disks). Typically, the I/O devices communicate with the CPU 120 by generating interrupts. The CPU 120 distinguishes interrupts from among the I/O devices through individual interrupt codes assigned thereto. Responses of the CPU 120 to the I/O device interrupts differ, depending, among other things, on the devices generating the interrupts. Interrupt vectors are provided to direct the CPU 120 to different interrupt handling routines.

The interrupt vectors are generated during initialization (e.g., boot up) of the computer system 10c by execution of the BIOS. Because responses of the CPU 120 to device interrupts may need to be changed from time to time, the interrupt vectors may need to be modified from time to time in order to direct the CPU 120 to different interrupt handling routines. To allow for modification of the interrupt vectors, they are stored in the RAM 130 during operation of the computer system 10c.

A disk control subsystem 140 bidirectionally couples one or more disk drives 142 (e.g., floppy disk drives, CD-ROM drives, etc.) to the system bus 122. The disk drive 142 works in conjunction with a removable storage medium such as a floppy diskette or CD-ROM.

A hard drive control subsystem 146 bidirectionally couples a rotating fixed disk, or hard drive 148 to the system bus 122. The hard drive control subsystem 146 and hard drive 148 provide mass storage for CPU instructions and data.

A terminal control subsystem 156 is also coupled to the bus 122 and provides output to a display device 158, typically a CRT monitor or LCD display, and receives inputs from a manual input device 160 such as a keyboard. The terminal control system, the display device, and the manual input device are typically included in the mobile systems described above, however, they may be optionally included with the directed information system and global positioning systems, for example.

A network adapter 170 is provided for coupling the system 10c to a network. It is noted that the directed information system requires a network adapter in order to access the Internet.

One of the preferred implementations of the present invention is as several sets of instructions in a code module resident in the main memory (e.g., RAM 130). Until required by the computer system 10c, the sets of instructions may be stored in another computer memory, for example, in a hard disk drive, or in a removable memory such as an optical disk for eventual use in a CDROM or a floppy disk for eventual use in the floppy disk drive.

In the preferred embodiment, the present invention is implemented via object oriented programming techniques. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance.

Objects hide or encapsulate the internal structure of their data and the algorithms by which their functions work. Instead of exposing these implementation details, objects present interfaces that represent their abstractions cleanly with no extraneous information. Polymorphism takes encapsulation one step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors which the developer then customizes to meet particular needs.

In particular, an object includes, and is characterized by, a set of data (e.g., image data) and a set of operations (e.g., methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization.

The use of object oriented programming provides for a framework approach to object based application development. The present invention employs abstract classes, which are designs of sets of objects that collaborate to carry out a set of responsibilities. Frameworks are essentially groups of interconnected objects and classes that provide a prefabricated structure for a working application.

Accordingly, a user interface framework in accordance with the present invention may provide the support and default behavior of user display windows, tool bars, command bars, etc. By basing the framework on object oriented technology, the behavior can be inherited and overridden to allow developers to extend the framework and create customized solutions in the push technology arena. As a result, significant advantages are achieved over employing conventional programming techniques used in the image analysis area since a programmer is not required to change original code but rather to extend from existing code. Moreover, the developers no longer have to work blindly through layers of code because the framework provides architectural guidance and modeling and also frees the programmers to supply specific actions unique to the image analysis problem domain.

According to an exemplary embodiment of the present invention, Java is employed to carry out the present invention. Java is an object-oriented, distributed, secure, architecture neutral language. Java provides for object-oriented design which facilitates the clean definition of interfaces and makes it possible to provide reusable "software ICs." Java has an extensive library of routines for copying easily with TCP/IP protocols like HTTP and FTP. Java applications can open and access objects across a network via URLs with the same ease to which programmers are accustomed to accessing a local file system.

Furthermore, Java utilizes "references" in place of a pointer model and so eliminates the possibility of overwriting memory and corrupting data. Instead of pointer arithmetic that is employed in many conventional systems, the Java "virtual machine" mediates access to Java objects (attributes and methods) in a type-safe way. In addition, it is not possible to turn an arbitrary integer into a reference by casting (as would be the case in C and C++ programs). In so doing, Java enables the construction of virus-free, tamper-free systems. The changes to the semantics of references make it virtually impossible for applications to forge access to data structures or to access private data in objects that they do not have access to. As a result, most activities of viruses are precluded from corrupting a Java system.

Java affords for the support of applications on networks. Networks are composed of a variety of systems with a variety of CPU and operating system architectures. To enable a Java application to execute anywhere on the network, a compiler generates an architecture neutral object file format—the compiled code is executable on many processors, given the presence of the Java runtime system. Thus, Java is useful not only for networks but also for single system software distribution. In the present personal computer market, application writers have to produce versions of their applications that are compatible with the IBM PC and with the Apple Macintosh. However, with Java, the same version of the application runs on all platforms. The Java compiler accomplishes this by generating bytecode instructions which have nothing to do with a particular computer architecture. Rather, they are designed to be both easy to interpret on any machine and easily translated into native machine code on the fly.

Being architecture neutral, the "implementation dependent" aspects of the system are reduced or eliminated. The Java virtual machine (VM) can execute Java bytecodes directly on any machine to which the VM has been ported. Since linking is a more incremental and lightweight process, the development process can be much more rapid and exploratory. As part of the bytecode stream, more compile-time information is carried over and available at runtime.

Thus, the use of Java in the present invention provides a server to send region-specific and related information programs over the network as easily as traditional servers send data. These programs can display and manipulate data, such as related advertising information on a client computer. The present invention through the use of Java supports execution on multiple platforms. That is the same programs can be run on substantially all computers—the same Java program can work on a Macintosh, a Windows 95 machine, a Sun workstation, etc. It should be appreciated, however, that a Java stand-alone application may be constructed to achieve a substantially equivalent result. Although the present invention is described with respect to employing Java, it will be appreciated that any suitable programming language may be employed to carry out the present invention.

The present invention instantiates Java client classes by name at run time to implement client interfaces to changing server components. That is the present invention integrates the Java programming to communicate with services distributed on various computers (e.g., mobile and stationary) on the intranet through the use of distributed object technology, which is discussed in greater detail below.

Using this technology, a related task can be performed by the computer most optimally suited for it, and these decisions can be made dynamically. For example, if a given computer that provides a service is busy or down, the system will find an alternate source for that service, and provide it to the client immediately. The combination of Java-based client software and distributed object based services leads to a client/server system that facilitates push technology substantially.

Most current and past object oriented programming (OOP) systems are restricted to utilizing and making calls to objects within the same address space as the process utilizing or calling the objects. That is, a process cannot typically access objects located within other processes including where those other processes are located on the same or different host computers. However, distributed OOP systems allow processes to access objects located in remote address spaces located in the same or other host systems. A standard for such distributed OOP systems currently exists called Common Object Request Broker Architecture (CORBA) and is described in The Common Object Request Broker: Architecture and Specification, published by the Object Management Group (OMG), which is hereby incorporated by reference. This architecture allows a process to make calls to objects in other address spaces typically by constructing the necessary communication paths during compilation.

In simple terms, CORBA allows applications to interact and communicate closely at a higher level of abstraction than merely sending packets of data back and forth. Applications in a heterogeneous computing environment can interact without worries of how the two different machines and operating systems can interface. Thus, CORBA specifies a system which provides interoperability between objects in a heterogeneous distributed environment and in a way transparent to the programmer. It is to be appreciated that CORBA is but one way of communicating with distributed objects. For example, a DCOM (Distibuted Componet Object Model) developed by Microsoft may be employed to accomplish the same task.

Figure 6:
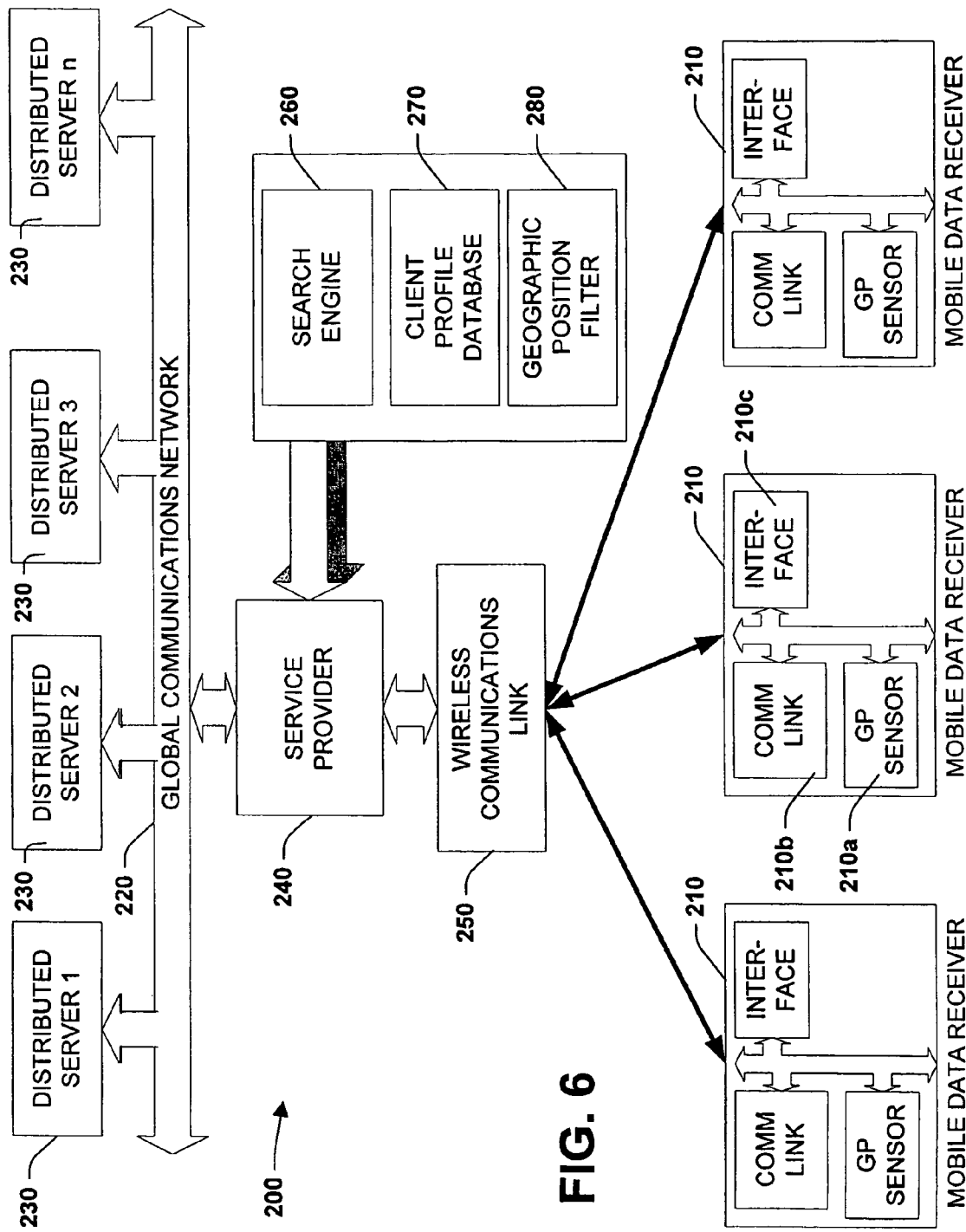
FIG. 6 is a schematic block diagram of a system for providing information to a mobile data receiver in accordance with the present invention.

Turning now to FIG. 6, a system 200 is provided for pushing information to a plurality of mobile data receivers 210 according to a user's profile and position. The system 200 associates the position of the mobile data receivers 210 with related information according to the identity of a user and directs information to the user. Information may be provided via a global communications network 220 (e.g., Internet) associated with a plurality of distributed servers 230 (e.g., web pages). The global communications network 220 may be wireless (e.g., satellite, cellular, PCS, infrared) or wired (e.g., telephone, twisted pair, coaxial cable). A server/service provider 240 directs information from the global communications network 220 via a wireless communications link 250 to the mobile data receivers 210. As will be described in more detail below, the server 240 may be provided with access to a search engine 260, a client data base 270, and a geographic position filter 280.

Referring now to the mobile data receivers 210, a geographic position sensor 210 is provided to indicate position of a user. Preferably, the sensor 210 is a high resolution (e.g., within about 50 ft. radius) global positioning system as described above. Alternatively, a personal communications system (PCS) may provide a substantially defined location of the user's position. For example, the PCS system generally includes transceivers which are associated with any given region or metropolitan area. Based upon communications between the PCS and related mobile data receiver 210, a position may be determined from the related communications associated therewith. The mobile data receiver also includes a wireless communications link 210b for communicating with the server 240. A human interface 210c includes an output mechanism (e.g., speaker, visual display, tactile device for visually impaired) to deliver related information to the user.

The mobile data receiver 210 along with providing position information to the server 240, also may provide a data receiver identifier for indicating specific facts, features, and/or other information related to the user. The data receiver identifier and position information is provided to the wireless communications link 250 and directed to the server 240.

The server 240 is operatively coupled to a client profile data base 270 which may be accessed via a search engine 260. The client data base 270 may include a mass storage medium and contains related information to predetermined user profiles. The user profiles can be determined for example, from past user accesses to the server 240 and/or may be determined by related demographic user information. The information may also be compiled, as described above, from previous sales exchanges and/or queries with the system 200. From the position data receiver identifier received from the mobile data receiver, the server 240 may direct the search engine 260 to provide (e.g., push) related information. For example, if the data receiver identifier is related to a single person who frequents expensive restaurants and shops, the server 240 can direct the search engine 260 to retrieve information related to the user's preferences while also limiting the search to the user's geographic location. Thus, substantially relevant information to a user's time and place is directed to the user while extraneous information that may be retrieved as with conventional systems is substantially removed. The geographic position filter 280 may be employed to further refine the search of information related to the user by further restricting the search engine 260 to information related to the users geographic position. This may be achieved by relating web sites associated with distributed servers 230 with geographic identifiers (e.g., XML embedded identifiers based upon predetermined regions). A search of information may then be based upon the users geographic position and the identifiers associated with the web sites. Thus, client profile information is further refined to a particular region.

By communicating through the server 240, the search engine 260 may have access to the global communications network 220 and/or substantially any mass storage medium for providing information. As described above, the search engine 240 may be substantially refined to relevant information sites of geographic interest since the global positioning system 210a can provide substantially high resolution position information to the global positioning filter 280.

Figure 7:
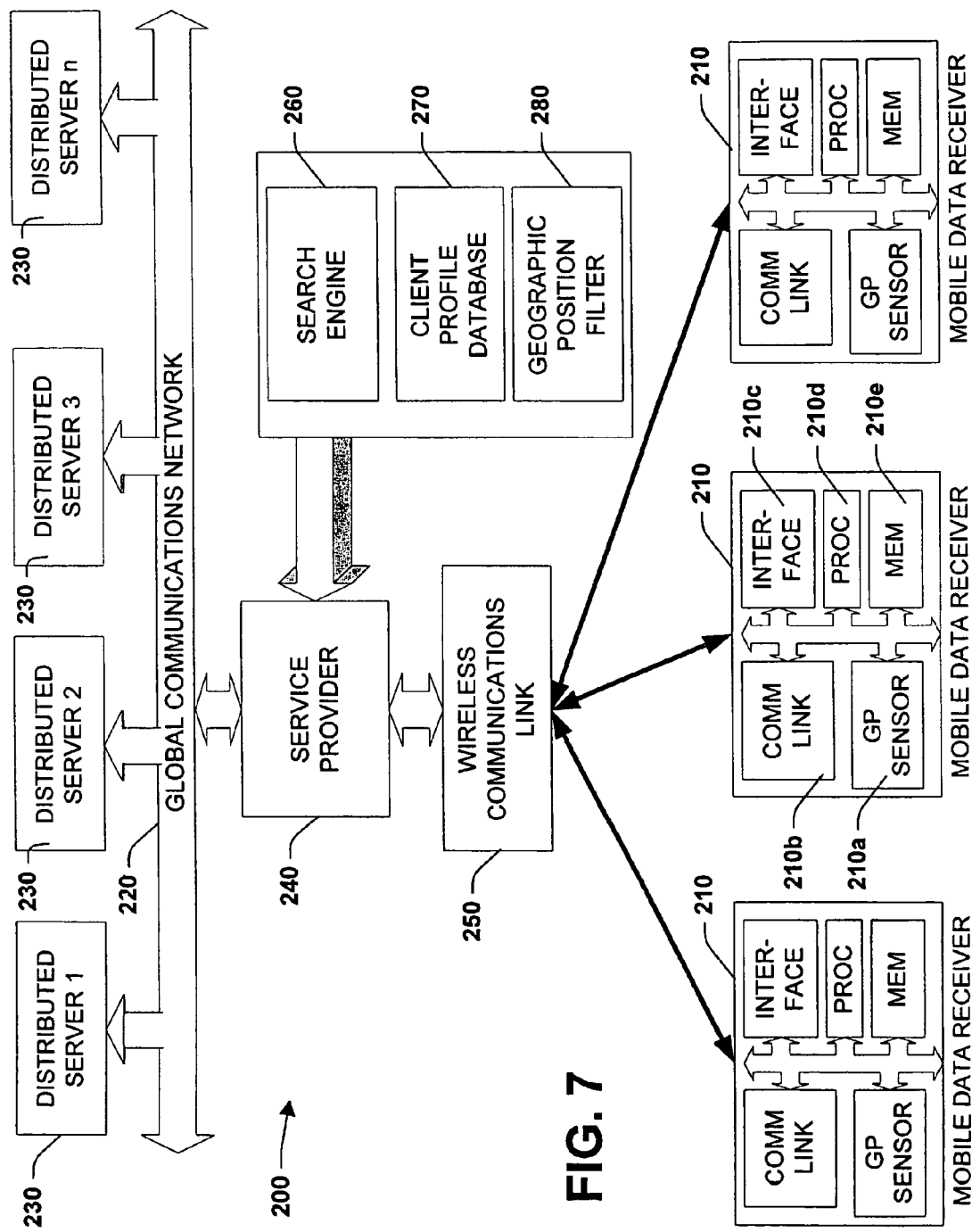
FIG. 7 is a schematic block diagram of an interactive system for providing and requesting information to and from a mobile data receiver in accordance with the present invention.

Referring now to FIG. 7, an interactive system 200a is depicted which enables a user to direct queries to a server 240. A processor 210d and associated memory 210e may be included with the mobile data receiver 210 to provide interactive access and/or query of the server 240. The processor 210d may be configured from the memory 210e to receive input (e.g., keyboard, audio, voice) from the human interface 210c. A data query may be initiated by associating a user identification number/code (user ID) with a particular request of information from the user. The server 240, upon receiving the query, may direct the search engine 260 to provide information based on the user ID and related position information. The user ID may be employed by the search engine 260 to retrieve a user profile from client profile database 270 to further refine the search. In this manner, substantially relevant information related to the user profile and the user's position may be efficiently provided. It is to be appreciated that the user may also initiate queries based on other factors than position and/or profile by initiating queries that expand the search process. For example, a query may be broadened by providing predetermined codes to the user which may be included in the query to override search restrictions on the user profile. In this manner, a user may desire to receive all relevant information related to a location rather than information substantially limited to the user profile.

Figure 8:
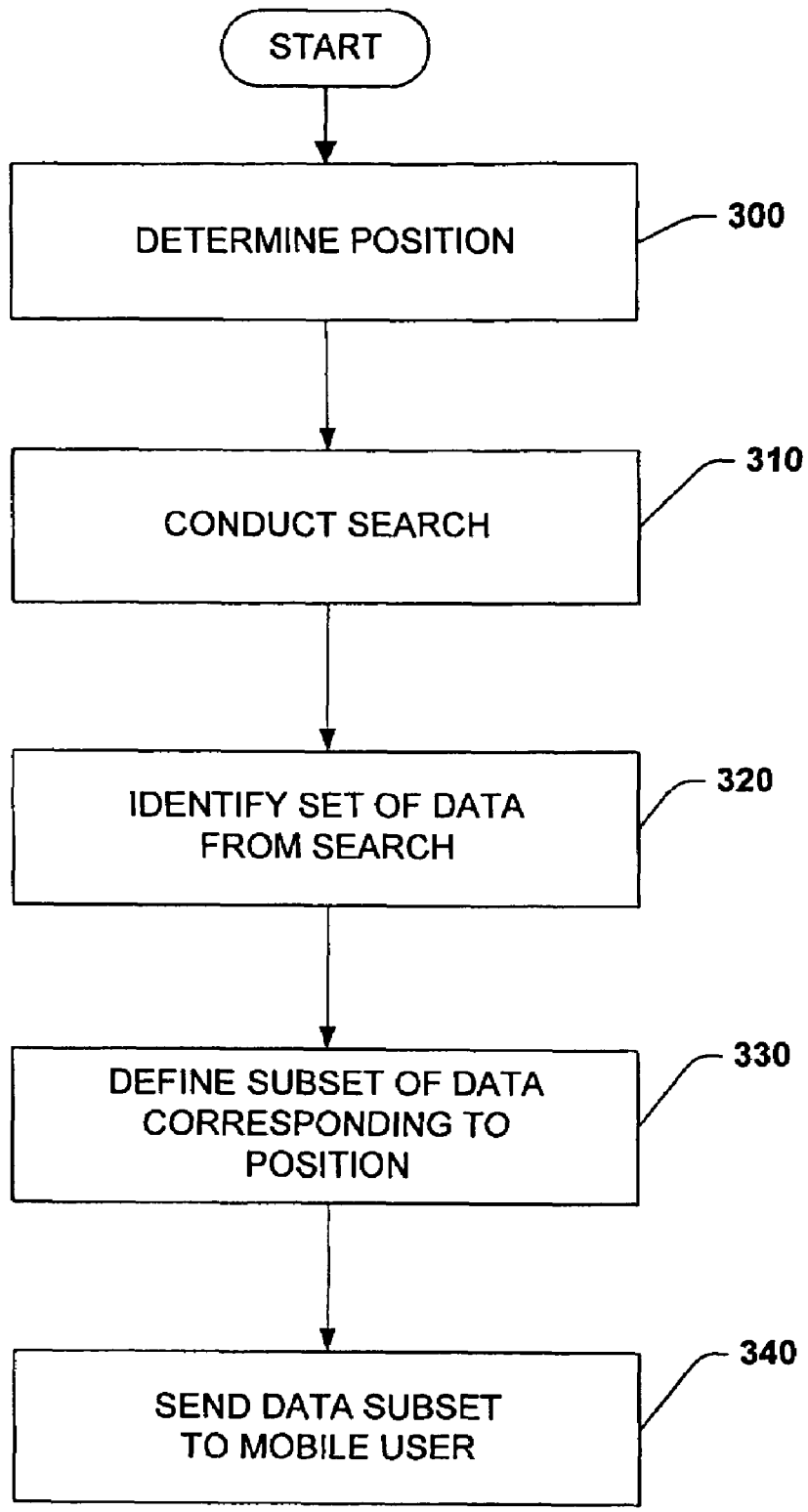
FIG. 8 is a flow diagram illustrating a methodology for pushing information in accordance with the present invention.

Now referring to FIG. 8, a flow diagram is shown which illustrates a methodology for pushing information to a user situated at a geographic location. At step 300, a position is determined for the user within a geographic location. As described above, this may be determined from a global positioning system located within a mobile data receiver. At step 310, a search is directed by a server. The search may be refined by limiting the search to known profiles associated with the user for example. At step 320, a set of data is identified that is responsive to the search initiated in step 310. At step 330, the identified data from step 320 is further refined to form a subset of identified data corresponding to the position information determined in step 300. At step 340, the subset of data determined in step 330 is transmitted to the mobile data receiver wherein the user may receive information related to the user's geographic location.

Figure 9:
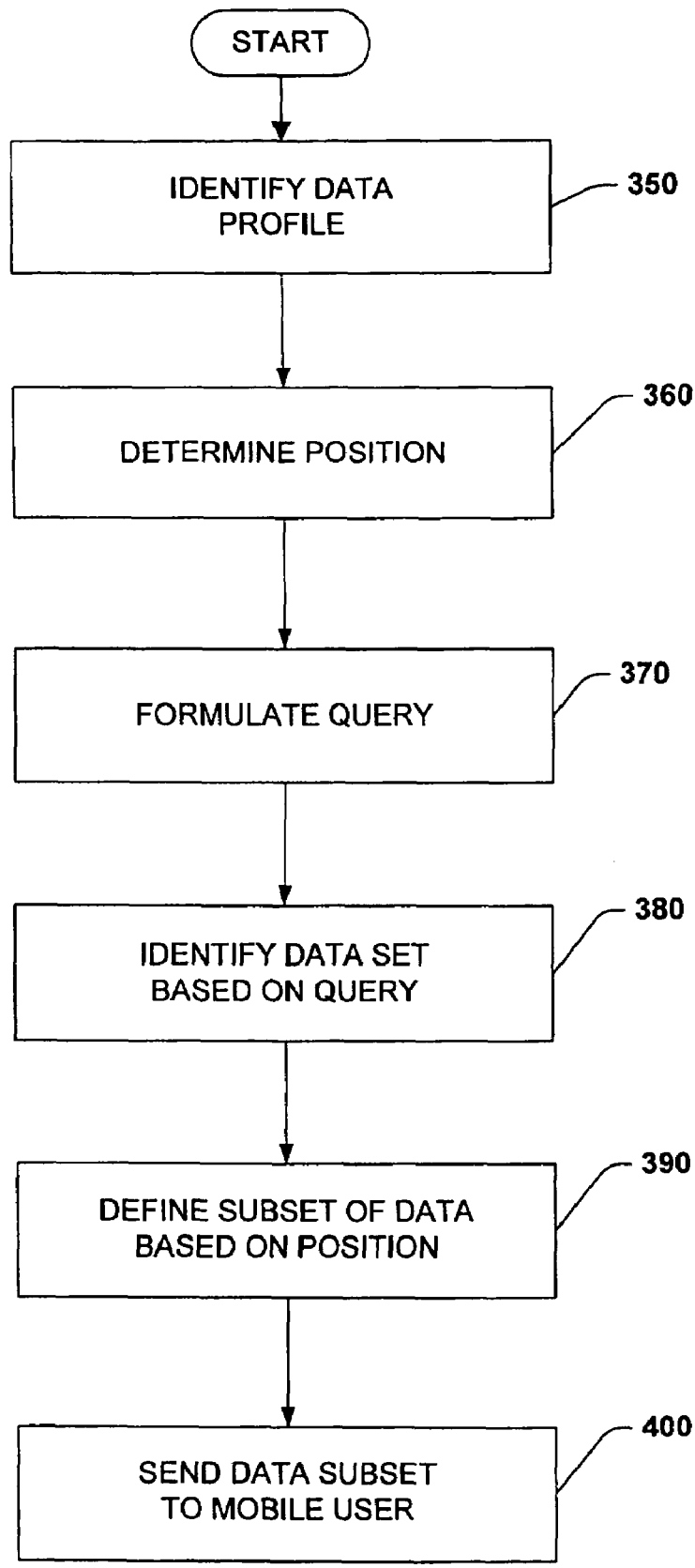
FIG. 9 is a flow diagram illustrating a methodology for querying information in accordance with the present invention.

Turning now to FIG. 9, a flow diagram is shown which illustrates a methodology for providing interactive information to a user associated with a mobile data receiver. At step 350, a data profile is identified for a user. As described above, the profile may be determined from demographic information for example. At step 360 a geographic position is determined for the mobile data receiver as described above. At step 370, a query is formulated based on the profile determined at step 350. The query may be interactively driven by the user from the mobile data receiver. At step 380, a search engine is utilized to retrieve a set of information responsive to the query in step 370. At step 390, a subset of the data retrieved in step 380, is further refined by the position information determined at step 360. At step 400, the subset of data determined at step 390 is transmitted to the mobile data receiver whereby the user may then receive the information. It is to be appreciated that the profile in step 350 may alternatively be determined by monitoring a user's prior queries to an information system. The user profiles may then be defined and determined substantially automatically in relation to the user's past access to the information system.

Figure 10:
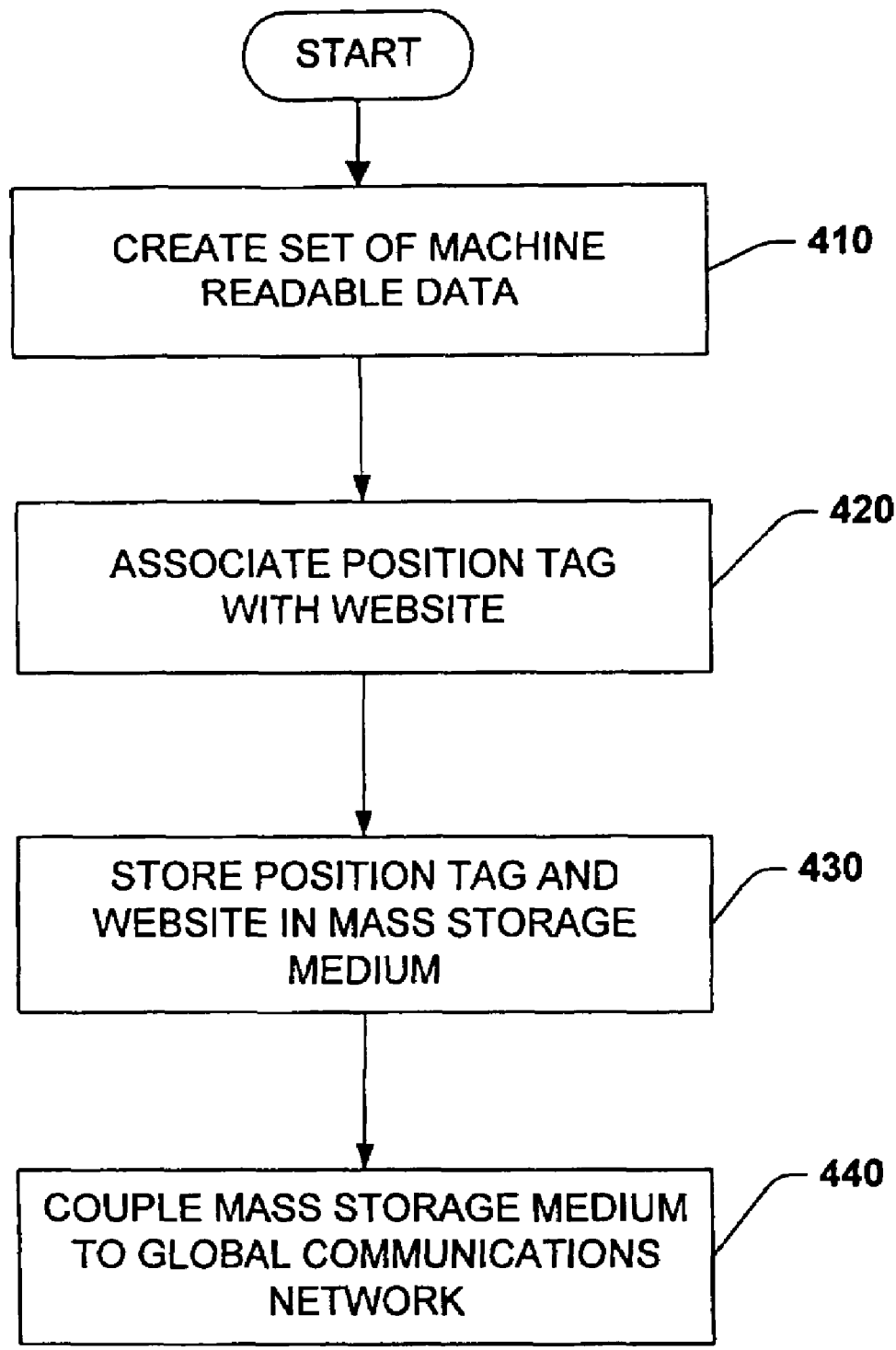
FIG. 10 is a flow diagram illustrating a methodology for providing website information relating to a position in accordance with the present invention.

Now turning to FIG. 10, a flow diagram illustrates a methodology for associating website information with related geographic information. At step 410, a set of machine readable data is created by forming a website in HTML format for example. At step 420, geographic position information (e.g., metatag) is associated with the website. At step 430, the position information and the related website is stored in a mass storage medium. At step 440, the mass storage medium is operatively coupled to a global communications network whereby information related to the website and associated geographic information may be provided.

What has been described above are preferred embodiments of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A computing device that facilitates searching for content, comprising:
    a memory that stores data; and
    a processor that interacts with a global positioning service in connection with establishing physical location of the device, the processor also transmits search queries for web pages to a search engine and receives search results that are displayed to a user, the search results comprise web pages having embedded region codes corresponding to the physical location of the device.

2. The device of claim 1 is a cellular phone.

3. The device of claim 1 is a personal data assistant.

4. The device of claim 1 is a lap top computer.

5. The device of claim 1 is an onboard computer of an automobile.

6. The device of claim 1 further comprising a display that visually conveys the search results.

7. The device of claim 1, the processor provides to the search engine information related to demographics of a user.

8. The device of claim 1, the processor provides to the search engine information related to preferences of a user.

9. A computing device that facilitates searching for content, comprising:
    a memory that stores data; and
    a processor that transmits to a search engine search queries for web pages and information related to location specific areas of interest to a user, the processor provides to the user search results comprising a plurality of web pages that are filtered at least in part on the location specific information and one or more embedded region codes.

10. The device of claim 9, the processor transmits a zip code as at least part of the information related to location specific areas of interest to the user.

11. The device of claim 9, the processor transmitting to the search engine user input information related to geographic region of interest.

12. The device of claim 9, the processor transmitting to the search engine a geographic region of interest to limit the search results to, the region is defined in terms of a bounded area.

13. The device of claim 12, the bounded area is defined in terms of square miles.

14. The device of claim 12, the bounded area is defined in terms of city blocks.

15. The device of claim 12, the bounded area is defined in terms of physical distance from current location of the user.

16. The device of claim 9, the processor receiving search results that are filtered such that the results are limited to sources of content originating within a pre-determined distance from a current location of the user.

17. The device of claim 9, the processor executes instructions that provides for the user to input geographic regions that search results should be limited to.

18. The device of claim 9, the processor receives information pushed to the device as a function of location of the device.

19. The device of claim 9, the memory having stored thereon computer executable instructions that provide for the device to receive search results that are associated with geographic regions of interest to the user.

20. A computing device that facilitates searching for content, comprising:
    means identifying location of a user;
    means for processing search queries for web pages from the user; and
    means for transmitting search results to the user that are a function of the location of the user and one or more region codes embedded within one or more of the search results.

* * * * *